S PATENT OFFICE.

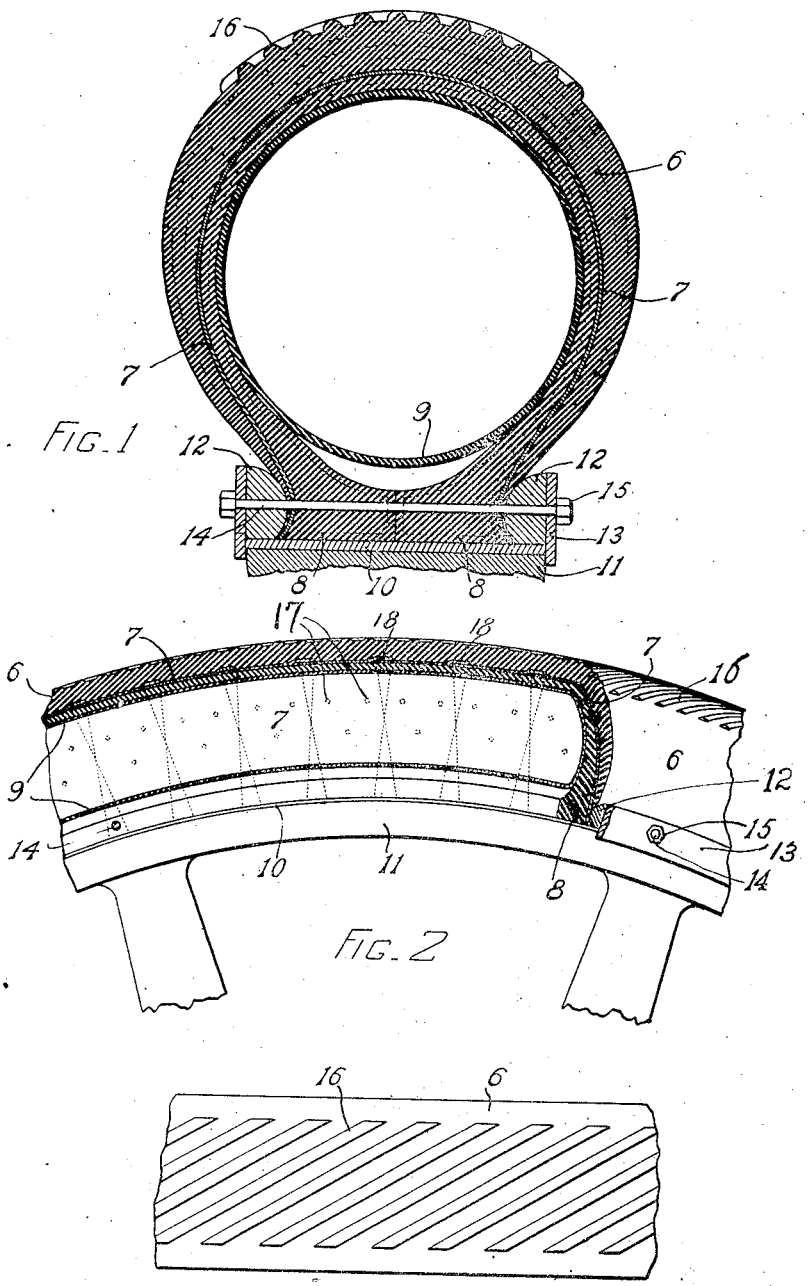

MELANCTHON HANFORD AND DANIEL L. TAYLOR, OF MALDEN, MASSACHUSETTS.

AUTOMOBILE-TIRE.

No. 920,735.

Specification of Letters Patent.

Patented May 4, 1909.

Application filed February 28, 1907. Serial No. 359,774.

*To all whom it may concern:*

Be it known that we, MELANCTHON HANFORD and DANIEL L. TAYLOR, both of Malden, in the county of Middlesex and State of Massachusetts, have invented certain new and useful Improvements in Automobile-Tires, of which the following is a specification.

The object of this invention is to improve automobile and bicycle tires in preventing liability of puncturing and, by the same feature of construction, giving them material internal support independent of their inflation. Such support resists the injurious effects of skidding, which movement is largely prevented by a peculiarity in the peripheries of the opposing tires, as is hereinafter explained. This non-puncturable support is embodied in a succession of transverse overlapping steel spring arches embedded in the jacket portion of the tire or interposed between it and the inflatable inner tube,—these arch-like plates tapering each way from the center of the tread portion and their extensions being firmly seated, terminally, on the wheel-rim. Other than this the anti-skidding feature consists in oppositely inclined ridges formed on the tread portions of each pair of tires, so that one tire, at least, of each pair shall resist the tendency of the wheels to slide laterally. These ridges also tend to throw the loosened mud somewhat outwardly from the track of each wheel. One or both flanges of the wheel-rim will be detachable from its main body to permit sidewise application of the tire. Marginal rings of half round metal are interposed between the seat portion of the tire and the adjacent flange. Transverse bolts pass through these parts.

In the drawings,—Figure 1 is a transverse section through a wheel-tire embodying our invention; Fig. 2 a longitudinal section of the tire, partly in elevation; and Fig. 3 a plan view of its corrugated periphery.

The tire proper comprises the jacket 6, made up of the usual vulcanized rubber and heavy cotton duck in alternate layers, with such thickness of the rubber externally as is requisite for elasticity of the tread. Embedded in this yielding body, or located immediately within it, is the succession of independent, non-puncturable arches 7, preferably of sheet steel, formed as indicated in Fig. 2, to overlap slightly along the tread portion and tapering to give space between adjacent plates at their inner ends for the passage, through the two-part tire-base 8, of the bolts 14 that unite the marginal rings and flanges thereto. The arch-plates 7 may be perforated at foot for the same purpose, and they will have numerous perforations 17 along each side, if embedded in the body of the tire, to permit the rubber to fill in and unite through such perforations in vulcanizing. The arches 7 are in contact at the points where they overlap, and the overlapping edges are provided with offsets or shoulders 18, which engage the edges of the adjacent arches, so that the inner faces of the arches, at the tread, will form a continuous curve. Tires thus constructed and internally supported by these steel arches have abundant strength and stiffness for use without inflation. The jacket may, however, be inflated direct or the usual inner tube 9 be employed in accordance with the common practice.

The numeral 10 indicates the metallic wheel-rim, of any preferred construction, adapted to hold the tire in position and give anchorage to its internal supports. The form best shown in Fig. 1 is suitable and, with the marginal rings, embodies part of the present invention.

As shown the rim 10 is a plain circular band, suitably secured around the wheel 11, so that the tire may be placed thereon by a sidewise movement. Half round rings 12 of suitable material are applied at the sides of the tire-base and, outside of these, flat marginal annular plates 13 take the place of the ordinary fixed flanges, but overlap the edges of the wheel 11 so as to prevent lateral displacement of the tire. All the parts are united and held in position on the wheel by the transverse bolts 14 and nuts 15, as in Fig. 1.

16 represents the oblique corrugation of one tire of each pair, the companion tire to have its corrugations similarly inclined in the opposite direction, so that each will resist any tendency of the other to slide laterally.

We claim as our invention:

The yielding tubular tire-body and the internal metallic support therefor, formed of overlapping steel arches resting at foot on the wheel-rim, in combination with marginal flanges embracing the edges of the wheel-rim, with rings interposed between said flanges and the tire-base, and with transverse bolt through said flanges, rings and base, substantially as set forth.

In testimony whereof we have affixed our signatures, in presence of two witnesses.
MELANCTHON HANFORD.
DANIEL L. TAYLOR.

Witnesses:
A. H. SPENCER,
GEORGE F. BUTTERFIELD.